United States Patent Office 3,105,850
Patented Oct. 1, 1963

---

3,105,850
PROCESS OF PREPARING β-4-METHOXYBEN-ZOYL-β-HALOACRYLIC ACIDS
Miroslav Semonský, Eva Ročková, and Václav Jelínek, all of Prague, Czechoslovakia, assignors to Spofa sdruzeni podniku pro zdravotnickou vyrobu, Prague, Czechoslovakia
No Drawing. Filed June 7, 1960, Ser. No. 34,376
Claims priority, application Czechoslovakia June 24, 1959
5 Claims. (Cl. 260—521)

The present invention relates to a process of preparing β-4-methoxybenzoyl-β-haloacrylic acids of the general formula

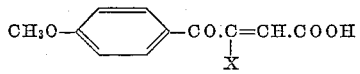

wherein X is a chlorine or bromine atom.

These compounds have been prepared in a study of cytostatic compounds such as γ-alkyl-α,β-dichloro- (or dibromo)-, or γ-aryl-α,β-dichloro- (or dibromo)-Δ$^{\alpha,\beta}$-crotonolactone and its hydrolysis products.

β-4-methoxybenzoyl-β-bromoacrylic acid has been described (Chem. Abstr. 54, 393f, 1960), whereas β-4-methoxybenzoyl-β-chloroacrylic acid is a new compound.

During the pharmacological investigation of the β-4-methoxybenzoyl-β-bromoacrylic acid in the form of its sodium salt it was observed that the therapeutically effective doses exhibit no important effect on blood pressure, breathing (rabbits), diuresis (rat), central nervous system and blood formation. The toxicity is relatively low ($LD_{50}$=320 mg./kg., for mice).

The process of preparing the above mentioned β-4-methoxybenzoyl-β-haloacrylic acids is based on hydrolysis of γ-4-methoxyphenyl-α,β-dichloro-(or dibromo)-Δ$^{\alpha,\beta}$-crotonolactone carried out by heating the compound in water in the presence of inorganic bases, preferably magnesium oxide, and in the presence of a solvent miscible with water, such as dioxane, at higher temperatures, preferably at the boiling point of the mixture.

Alkaline earth oxides, hydroxides or carbonates, e.g. magnesium oxide or calcium carbonate, can be used as the necessary inorganic bases. Dioxane can be replaced by another solvent miscible with water, e.g. methanol, ethanol etc.

According to the invention, a mixture of 1 mole of the lactone, water, dioxane and at least 1 mole of magnesium oxide is refluxed for at least 15 min. The β-4-methoxybenzoyl-β-haloacrylic acid is then isolated by evaporating the reaction mixture to dryness, dissolving the magnesium salts in water or an aqueous sodium bicarbonate solution, and acidifying the solution.

Various water soluble salts of β-4-methoxybenzoyl-β-haloacrylic acids are easily prepared by the addition of an equivalent amount of alkali to a medium in which the starting material is soluble, but in which the salts formed are only slightly soluble (e.g. sodium ethoxide in anhydrous ethanol). The salts thus obtained can be crystallized from a mixture of water-ethanol-ether.

The starting material for the synthesis of β-4-methoxybenzoyl-β-chloroacrylic acid, i.e. γ-4-methoxyphenyl-α,β-dichloro-Δ$^{\alpha,\beta}$-crotonolactone can be prepared by condensation of anisole with β-formyl-α,β-dichloroacrylic acid (mucochloric acid) in the presence of an acid condensing reagent such as polyphosphoric acid. (V. Ettel, M. Semonský, V. Zikán, Chem. listy 46, 63 [1952].) By the same procedure, γ-4-methoxyphenyl-α,β-dibromo-Δ$^{\alpha,\beta}$-crotonolactone (M.P. 98–99°) is prepared from anisole and mucobromic acid.

β-4-methoxybenzoyl-β-haloacrylic acids can also be produced by other methods, such as elimination of one molecule of hydrogen halide from both stereoisomeric β-4-methoxybenzoyl-α,β-dichloro-(or dibromo)-propionic acids by means of sodium acetate in acetic acid at elevated temperatures, or by saponification of esters of the cyclic form of cis-β-4-methoxybenzoyl-β-haloacrylic acids (e.g. of γ-4-methoxyphenyl-γ-methoxy-β-bromo-Δ$^{\alpha,\beta}$-crotonolactone. All the mentioned procedures, as well as the preparation of the β-4-methoxybenzoyl-β-bromo acrylic acid by the Friedel-Crafts reaction of anisole with bromomaleic acid, are less advantageous in comparison with the preparation according to this invention. They give the required β-4-methoxybenzoyl-β-haloacrylic acids in considerably lower yields, and in addition, the starting materials for their syntheses are less readily available.

Chemical structure and homogeneity of the β-4-methoxybenzoyl-β-haloacrylic acids was proved by chemical as well as physiochemical methods. On the basis of infrared spectroscopy both compounds can be assigned the trans configuration of the halogen and hydrogen atoms.

Example

A mixture of 20 ml. of water, 20 ml. of dioxane and of 0.40 g. (0.01 mole) of magnesium oxide is refluxed in a steam bath. In the course of 3 minutes, a solution of 0.01 mole of γ-4-methoxyphenyl-α,β-dichloro-Δ$^{\alpha,\beta}$-crotonolactone in 5 ml. of dioxan is added dropwise. Thereafter the reaction mixture is heated under reflux for an additional 75 minutes. The volatile components are then removed by vacuum distillation, the residue is treated with a solution of 2 g. of sodium bicarbonate in 40 ml. of water, filtered and acidified to pH 1 with hydrochloric acid.

After allowing the mixture to stand for 12 hours at 4° in an ice-box, the deposited crystals are filtered off under suction, washed with a small amount of ice-cold water, and dried at room temperature. The yield is 89–93%. The products thus obtained are relatively pure and can be further purified by crystallization from water or an organic solvent such as benzene.

β-4-methoxybenzoyl-β-chloroacrylic acid forms colorless leaflets, melting at 116–117° (from water, uncorrected), β-4-methoxybenzoyl-β-bromoacrylic acid has a similar appearance and melts at 146–147.5° (from water, uncorrected).

What is claimed is:
1. Method of producing a β-4-methoxybenzoyl-β-haloacrylic acid of the formula:

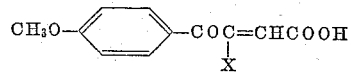

wherein X is selected from the group consisting of chlorine and bromine, which comprises subjecting a γ-4-methoxyphenyl-α,β-dihalo-Δ$^{\alpha,\beta}$-crotonolactone wherein halo is selected from the group consisting of chlorine and bromine to alkaline hydrolysis in the presence of an inorganic base selected from the group consisting of alkaline earth oxides, hydroxides and carbonates, thereby forming the corresponding β-4-methoxybenzoyl-β-haloacrylic acid.

2. Method of producing a β-4-methoxybenzoyl-β-haloacrylic acid of the formula:

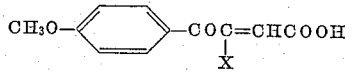

wherein X is selected from the group consisting of chlorine and bromine, which comprises subjecting a γ-4-methoxyphenyl-α,β-dihalo-Δ$^{\alpha,\beta}$-crotonolactone wherein halo is selected from the group consisting of chlorine and bromine to alkaline hydrolysis in the presence of magnesium oxide, thereby forming the corresponding β-4-methoxybenzoyl-β-haloacrylic acid.

3. Method of producing a β-4-methoxybenzoyl-β-haloacrylic acid of the formula:

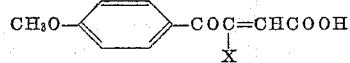

wherein X is selected from the group consisting of chlorine and bromine, which comprises subjecting a γ-4-methoxyphenyl - α,β - dihalo-Δ$^{α,β}$-crotonolactone wherein halo is selected from the group consisting of chlorine and bromine to alkaline hydrolysis in an aqueous medium containing an inorganic base selected from the group consisting of alkaline earth oxides, hydroxides and carbonates in the presence of a solvent miscible with water and non-reactive with the reaction mixture, thereby forming the corresponding β-4-methoxybenzoyl-β-haloacrylic acid.

4. Method of producing a β-4-methoxybenzoyl-β-haloacrylic acid of the formula:

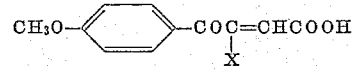

wherein X is selected from the group consisting of chlorine and bromine, which comprises subjecting a γ-4-methoxyphenyl - α,β - dihalo-Δ$^{α,β}$-crotonolactone wherein halo is selected from the group consisting of chlorine and bromine to alkaline hydrolysis in an aqueous medium containing an inorganic base selected from the group consisting of alkaline earth oxides, hydroxides and carbonates in the presence of a solvent miscible with water and non-reactive with the reaction mixture, and being selected from the group consisting of dioxane, methanol and ethanol, thereby forming the corresponding β-4-methoxybenzoyl-β-haloacrylic acid.

5. Method of producing a β-4-methoxybenzoyl-β-haloacrylic acid of the formula:

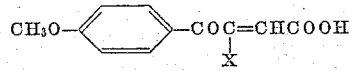

wherein X is selected from the group consisting of chlorine and bromine, which comprises subjecting a γ-4-methoxyphenyl - α,β - dihalo-Δ$^{α,β}$-crotonolactone wherein halo is selected from the group consisting of chlorine and bromine to alkaline hydrolysis in an aqueous medium containing magnesium oxide in the presence of dioxane, thereby forming the corresponding β-4-methoxybenzoyl-β-haloacrylic acid.

References Cited in the file of this patent
UNITED STATES PATENTS 2,508,990    Burtner ---------------- May 23, 1950
2,562,208    Papa et al. ------------ July 31, 1951

OTHER REFERENCES

Bogert et al.: "J. Am. Chem. Soc.," vol. 47, pp. 526–535 (1925).

Papa et al.: "J. Am. Chem. Soc.," vol. 70, pp. 3356–3360, October 1948.

Migrdichian: "Organic Synthesis," vol. I, page 270, 1957.

Zugravescu et al.: Annalele Stiintifice ale Univ. Al. I. Cuza, Iasi. Sect. 14, 191–198, 1958.

Zugravescu et al.: "Chem. Abstracts," vol. 54, page 393, January–February 1960.